(12) United States Patent
Hiraoka

(10) Patent No.: US 6,704,164 B1
(45) Date of Patent: Mar. 9, 2004

(54) VIBRATION REDUCING MEMBERS FOR HEAD SUSPENSIONS

(75) Inventor: Shinji Hiraoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/459,115

(22) Filed: Dec. 10, 1999

(30) Foreign Application Priority Data

Apr. 30, 1999 (JP) ............................................. 11-125204
Jul. 1, 1999 (JP) ............................................. 11-187230

(51) Int. Cl.⁷ ................................................. G11B 5/10
(52) U.S. Cl. .................................... 360/244.8; 360/246
(58) Field of Search ......................... 360/244.3, 244.8, 360/244.9, 245.9, 246, 244.2

(56) References Cited

U.S. PATENT DOCUMENTS

| | | | |
|---|---|---|---|
| 4,819,094 A | | 4/1989 | Oberg ...................... 360/245.9 |
| 4,996,616 A | * | 2/1991 | Aoyagi et al. ............... 360/104 |
| 5,126,904 A | * | 6/1992 | Sakurai .................... 360/244.2 |
| 5,187,625 A | * | 2/1993 | Blaeser et al. .............. 360/104 |
| 5,299,081 A | * | 3/1994 | Hatch et al. ................ 360/104 |
| 5,461,525 A | * | 10/1995 | Christianson et al. ....... 360/104 |
| 5,594,607 A | * | 1/1997 | Erpelding et al. ........... 360/104 |
| 5,598,307 A | * | 1/1997 | Bennin ....................... 360/104 |
| 5,771,135 A | * | 6/1998 | Ruiz et al. .................. 360/104 |
| 5,796,553 A | * | 8/1998 | Tangren ...................... 360/104 |
| 5,801,905 A | * | 9/1998 | Schirle et al. ............. 360/265.9 |
| 5,825,590 A | * | 10/1998 | Ohwe .......................... 360/104 |
| 5,850,319 A | * | 12/1998 | Tangren ...................... 360/104 |
| 5,943,191 A | * | 8/1999 | Giere et al. ................. 360/104 |
| 5,949,617 A | * | 9/1999 | Zhu ............................ 360/104 |
| 5,995,335 A | * | 11/1999 | Jurgenson et al. ........ 360/244.8 |
| 6,005,750 A | * | 12/1999 | Willard et al. .............. 360/104 |
| 6,028,742 A | * | 2/2000 | Kazama .................... 360/244.8 |
| 6,055,131 A | * | 4/2000 | Takahashi et al. ........... 360/104 |
| 6,141,187 A | * | 10/2000 | Wong et al. .............. 360/244.8 |
| 6,201,664 B1 | * | 3/2001 | Le et al. ................... 360/244.9 |
| 6,212,043 B1 | * | 4/2001 | Nakamura et al. ........ 360/244.3 |
| 6,215,622 B1 | * | 4/2001 | Ruiz et al. ................ 360/244.3 |
| 6,307,719 B1 | * | 10/2001 | Mallary .................... 360/294.7 |
| 6,362,936 B2 | * | 3/2002 | Inoue et al. .............. 360/244.2 |
| 6,388,842 B1 | * | 5/2002 | Murphy .................... 360/244.8 |
| 6,504,684 B1 | * | 1/2003 | Danielson et al. ........ 360/244.8 |

FOREIGN PATENT DOCUMENTS

| | | |
|---|---|---|
| EP | 0 847 043 | 6/1998 |
| JP | 1-248372 | 10/1989 |
| JP | 8249849 | 9/1996 |
| JP | 10-64210 | 3/1998 |

\* cited by examiner

*Primary Examiner*—Brian E. Miller
(74) *Attorney, Agent, or Firm*—Greer, Burns & Crain, Ltd.

(57) ABSTRACT

An object of the present invention is to provide a head suspension, which can be assembled without damaging the head element. In the head suspension, a rigid section holds a head slider which writes data on and reads data from a disk. The rigid section is capable of bearing an external force whose direction is perpendicular to a recording face of the disk. A spring section has elasticity in the direction perpendicular to the recording face of the disk. An anti-vibration member is provided in the spring section, the anti-vibration member partially has a vacant space. With this structure, change of elastic pressure of the head suspension can be maintained within a proper range, transmitting the vibration to the head slider can be restricted, and the head slider can be floated stably.

8 Claims, 7 Drawing Sheets

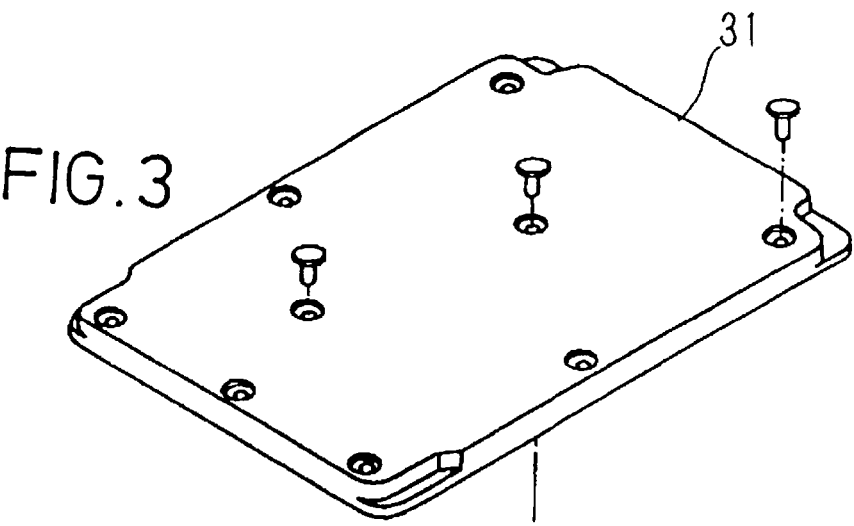
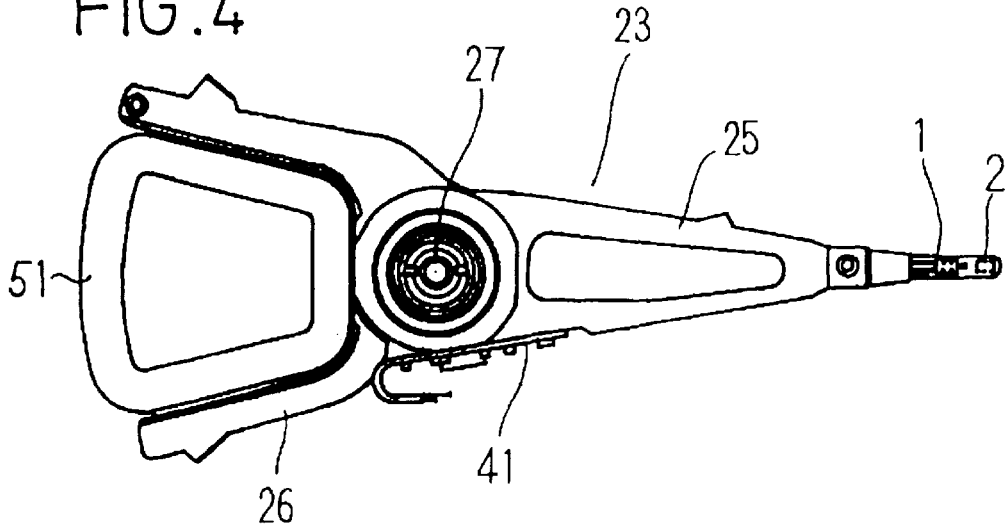

VIBRATION REDUCING MEMBERS FOR HEAD SUSPENSIONS

BACKGROUND OF THE INVENTION

The present invention relates to a head suspension for holding a head slider and a disk drive unit, and more precisely relates to a head slider which includes an anti-vibration structure for restricting transmission of vibration to the head slider, and a countermeasure to static electricity during manufacturing, and a disk drive unit including said head suspension.

In a disk drive unit, e.g., a hard disk drive unit, a magnetic optical disk drive unit, a head slider floats over a rotating disk. A head element, which is mounted on the head slider, writes data on or reads data from the disk. These days, to increase recording density of the disk, the floating level of the head slider is made lower and the size of the head element is made smaller. In the disk drive unit, it is important to restrict vibration of the head slider, which is held by a head suspension, so as to correctly position the head element. If the head slider is vibrated, control for positioning the head element is very difficult, a high speed operation of the head slider is obstructed and writing errors or reading errors are apt to occur, so that reliability of the disk drive unit must be lower.

A conventional head suspension is shown in FIGS. 1A and 1B. FIG. 1A is a plan view of the head suspension; FIG. 1B is a side view thereof.

A head suspension 13 has a gimbal 2, which has a front end on which a head slider 3 is mounted. A base end of the head slider 13 is attached to an arm (not shown) with a spacer 7. The arm is turned about a shaft so as to move the head slider 3 to an assigned position on the disk.

In the head suspension 13 shown in FIG. 1, vibrations which are generated in a voice coil motor (not shown) for driving the arm, and a spindle motor (not shown) for rotating the disk, are apt to be transmitted to the head slider 3. To restrict the transmission of the vibrations, an anti-vibration member 6 is adhered on a head suspension 14 as shown in FIG. 2. The anti-vibration member 6 is adhered on a face opposite to the face on which the head slider 3 is mounted. By adhering the anti-vibration member 6, the anti-vibration member 6 is vibrated by the vibration of the head suspension 14, so that vibration energy is converted into heat energy. By converting the vibration energy, the vibration transmitted to the head slider 3 can be restricted.

However, these days, a higher access speed of the disk drive unit is required. During the accessing action, the head slider is moved at high speed and a great acceleration is applied to the head suspension. As a result, the head suspension 14 is vibrated more. Thus, in spite of the anti-vibration member, the vibrations of the head slider cannot be ignored.

By covering not only the rigid section 4 but also the spring section 5 with the anti-vibration member 6, the vibration of the head slider can be restricted. But, by covering the spring section 5 with the anti-vibration member 6, a predetermined elastic pressure of the head suspension 14 is changed. The elastic pressure of the head suspension 14 influences the floating level of the head slider 3. If the elastic pressure is much greater than the predetermined value, the floating level of the head slider 3 is quite low so that the head slider 3 is apt to be crushed. On the other hand, if the elastic pressure is much less than the predetermined value, the floating level of the head slider 3 is quite high so that recorded data cannot be read correctly and reading errors are frequently caused. Therefore, the head suspension must keep the predetermined elastic pressure. Further, the head suspension must have an improved anti-vibration member so as to execute high speed operation. By improving the disadvantages of the conventional head suspension, a reliable disk drive unit can be realized.

The anti-vibration member 6 must be carefully adhered onto the head suspension 14 so as not to damage the head element of the head slider 3 by static electricity. The head element is a precise element, e.g., an MR element, a GMR element, so its resisting voltage is quite low, e.g., 5–20 [V].

The anti-vibration member 6 is usually adhered on a release paper. When the anti-vibration member 6 is to be adhered, it is peeled off from the release paper. When the anti-vibration member 6 is peeled off, static electricity of 200 or more is generated. Conventionally, the static electricity is neutralized by an ionizer, then the anti-vibration member 6 is adhered onto the head suspension 14. However, the static electricity cannot be fully neutralized, so the head elements are often damaged and the reliability of the disk drive units are made lower.

SUMMARY OF THE INVENTION

An object of the present invention is to provide a head suspension, which can be assembled without damaging the head element.

Another object of the present invention is to provide a reliable disk drive unit including the head suspension.

The head suspension of the present invention comprises: a rigid section for holding a head slider which writes data on and reads data from a disk, the rigid section being capable of bearing an external force whose direction is perpendicular to a recording face of the disk; a spring section having elasticity in the direction perpendicular to the recording face of the disk; and an anti-vibration member being provided in the spring section, the anti-vibration member partially having a vacant space. With this structure, area of the anti-vibration member covering the spring section can be correctly maintained, so that change of elastic pressure of the head suspension, which is caused by adhering the anti-vibration member, can be restricted. As a result, the change of the elastic pressure of the head suspension can be maintained within a proper range, vibration transmission to the head slider can be restricted, and the head slider can be floated stably.

In the head suspension, the anti-vibration member may cover the rigid section and the spring section and may have an opening or a slit in a part covering the spring section. With this structure, the area of the anti-vibration member covering the spring section is reduced, so that the head suspension never has excessive elastic pressure and the head slider can be stably floated, without loosing the effect of the anti-vibration member, which restricts the vibration of the head suspension.

In the head suspension, the anti-vibration member may be divided into a first anti-vibration member, which covers the rigid section, and a second anti-vibration member, which covers the spring section, with a separation. By dividing the anti-vibration member, areas covered with the first and second anti-vibration members are separated. As a result, in comparison with the head suspension in which the anti-vibration member covers the rigid section and the spring section, the head suspension having less elastic pressure can be realized, and the head slider can be stably floated without losing the effect of the anti-vibration member, which restricts the vibration of the head suspension.

In the head suspension the second anti-vibration member may be located on a border between the spring section and a spacer of a base end of the head suspension. With this structure, both of the anti-vibration member and the spacer restrict the vibration. Further, the change of the elastic pressure of the head suspension can be restricted to a minimum because the area of the spring section covered with the anti-vibration member is small.

The disk drive unit of the present invention includes the head suspension of the present invention. By employing said head suspension, the disk drive unit can be reliably operated at high speed because the head suspension maintains the proper elastic pressure and the vibration of the head slider can be effectively restricted.

Another head suspension of the present invention comprises: a base member; an anti-vibration member for restricting vibration of a head slider, the anti-vibration member being provided on the base member; and an electric conductive layer being formed on the anti-vibration member. By the electric conductive layer on the anti-vibration member, charging static electricity in the anti-vibration member can be prevented and the head element of the head slider of the head suspension is never damaged by the static electricity.

The disk drive unit including this head suspension can have high reliability.

BRIEF DESCRIPTION OF THE DRAWINGS

Embodiments of the present invention will now be described by way of examples and with reference to the accompanying drawings, in which:

FIG. 3 is a perspective view of a disk drive unit of an embodiment of the present invention;

FIG. 4 is a plan view of an actuator;

DETAILED DESCRIPTION OF THE PREFERRED EMBODIMENTS

Figure 1A:
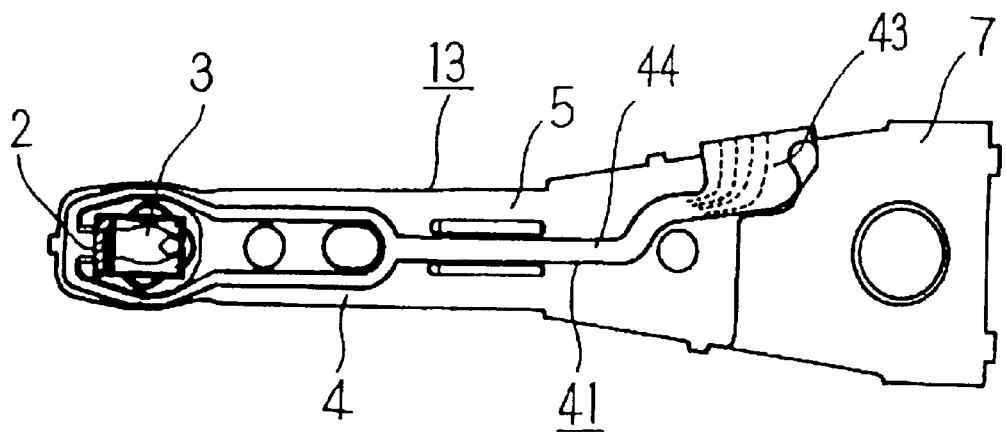
FIG. 1A is a plan view of the conventional head suspension.

Preferred embodiments of the present invention will now be described in detail with reference to the accompanying drawings.

FIG. 3 is a perspective view of a hard disk drive unit including a plurality of the head suspensions of the present invention. The hard disk drive unit comprises: a plurality of hard disks 21 on each of which data are recorded; a spindle motor 22 for rotating the hard disks 21; a plurality of actuators 23 for moving head sliders to assigned tracks of the hard disks 21; a voice coil motor 24 for swinging the actuators 24; a cover 31; and an enclosure 30 including a base section 32. The parts 21, 22, 23, 24, etc. are accommodated in the enclosure 30.

The hard disks 21 are fixed to a rotor section of the spindle motor 22 and rotated about a spindle shaft. Each surface of the hard disks 21 includes: a data zone in which a plurality of tracks, in which data including servo data will be recorded, are coaxially formed; and a CSS zone to which the head slider 3 is moved when the hard disk drive unit is not driven. Note that, in the present embodiment, the disk drive unit has a plurality of the hard disks 21, but the number of the hard disks may be one.

FIG. 4 is a plan view of the actuator 23. The surface shown in FIG. 4 does not face the hard disk 21. The actuator 23 has a head arm 25 and a coil arm 26. The actuator 23 is supported by and capable of rotating about a swing shaft 27. The head arm 25 and the coil arm 26 are located on opposite sides with respect to the swing shaft 27. Note that the head arm 25 and the coil arm 26 are made of aluminum, and are formed integrally.

A voice coil 51 is provided in the coil arm 26. The voice coil motor 24, which drives the actuators 23, includes a yoke 52 and a permanent magnet 53 (see FIG. 3).

The head arm 25 supports a head suspension 1. The head slider 3 is mounted on a front end of the head suspension 1. A plurality of the head suspensions 1 are respectively corresponded to recording surfaces of the hard disks 21. Each head suspension 1 has a gimbal 2 at a front end, and the head slider 3 is mounted on one face of the gimbal 2, which faces to the recording face of the hard disk 21.

The head slider 3 faces the recording face of the hard disk 21 and is electrically connected to a control section (not shown) with head wires 41, etc. The head slider 3 writes data, which are sent from the control section, in the tracks of the hard disk 21. Further, the head slider 3 has a head element, e.g., an MR element, which reads the data recorded on the hard disk 21 and sends the data to the control section. While the hard disk drive unit is not driven, the head slider 3 contacts the CSS zone in an inner area of the hard disk 21; while the hard disk drive unit is driven, the head slider 3 is floating over the recording face of the rotating hard disk 21. The floating level of the head slider is 20–30 nm.

Figure 5:
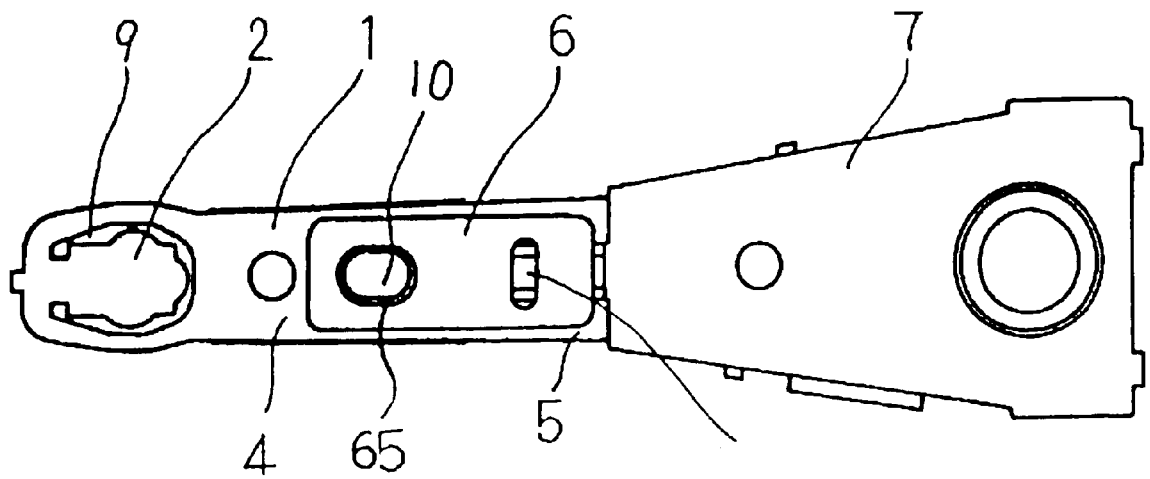
FIG. 5 is a plan view of a head suspension of a first embodiment of the present invention.

A first embodiment of the head suspension of the present invention is shown in FIG. 5. The surface shown in FIG. 5 does not face the hard disk 21. Note that, a shape and a structure of a bottom surface, which faces the hard disk 21, of the head suspension 1 are similar to those shown in FIG. 1A; a side view of the head suspension 1 is similar than that shown in FIG. 1B.

A base of the head suspension 1 is a thin stainless steel having thickness of about 26 μm and length of 15–20 nm. A slit 9 is formed in a front end section of the head suspension 1. An area enclosed by the slit 9 is the gimbal 2 on which the head slider 3 is mounted. Longitudinal edges of the head suspension 1 are partially bent to form ribs 8 as well as the conventional head suspension shown in FIG. 1B. A part in which the ribs 8 are formed is a rigid section 4 having greater toughness.

A base end of the head suspension 1 is fixed to a spacer 7 by spot welding, etc. The head suspension 1 is fixed to the head arm 25, together with the spacer 7, by caulking. The spacer 7 is made of stainless steel, etc. and has thickness of 0.2–0.25 mm.

A spring section 5, whose toughness is relatively low, is formed between the base end of the head suspension 1 and the rigid section 4. Length of the rigid section 4 is 3 mm; length of the spring section 5 is 2 mm; length of a part overlapping the spacer 7 is 3–5 mm. Note that, width of the rigid section 4 and the spring section 5 are 2 mm.

A cable 41, which transmits reading and writing data to and from the head element, is provided on the surface of the head suspension 1, which faces the hard disk, as well as the head suspension shown in FIG. 1A. The cable 41 includes: four signal wires 43 (two for writing data and two for reading data); and a cover film 44 for covering the signal wires 43 (see FIG. 1A). Thickness of the cover film 44 is 20–30 μm. The cover film 44 is usually made from polyamide. The cable 41 is bent at its base end. Pad terminals 45, each of which is connected to each signal wire 43, are provided in the vicinity of the bent section of the cable 41 (see FIG. 1B).

On the opposite face of the head suspension 1, which does not face the hard disk, an anti-vibration member 6 for restricting the vibration of the suspension 1 is adhered. In the present embodiment, the anti-vibration member 6 covers over the rigid section 4 and the spring section 5 of the head suspension 1. The anti-vibration member 6 is formed into a rectangle and its outer edge corners are rounded. In the present embodiment, length of the anti-vibration member 6 is 4.1 mm and width thereof is 1.6 mm. A through-hole 10 for correct positioning is bored in the rigid section 4 of the head suspension 1; a similar hole 65 for correct positioning is bored in the anti-vibration member 6. The hole 65 of the anti-vibration member 6 corresponds to the through-hole 10 of the head suspension 1, and the anti-vibration member 6 is adhered on the head suspension 1.

Figure 6A:
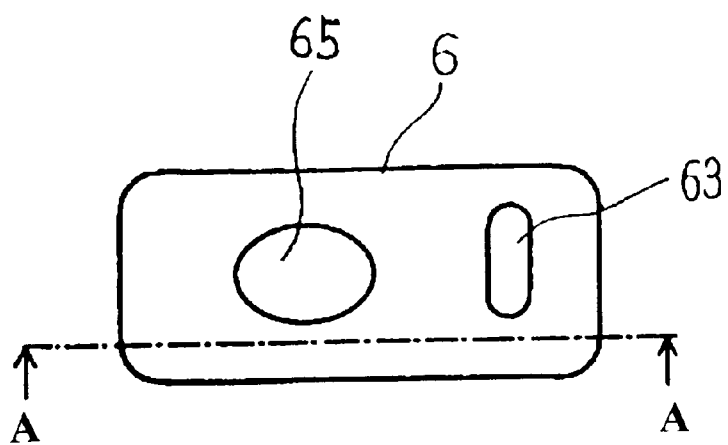
FIG. 6A is a plan view of an anti-vibration member of the first embodiment.
Figure 6B:
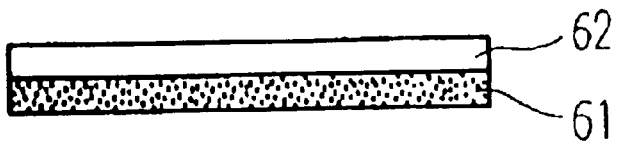
FIG. 6B is a side sectional view of the anti-vibration member thereof.

A structure of the anti-vibration member 6 is shown in FIGS. 6A and 6B. FIG. 6B is a sectional view taken along a line A—A. The anti-vibration member 6 has a multi-layered structure. In the present embodiment, the anti-vibration member 6 includes two layers: a viscous-elastic layer 61 and a restraint layer 62. The viscous-elastic layer 61 has viscosity and elasticity, makes the head suspension 1 tightly fit on the head suspension 1, and converts vibration energy, which is applied to the head suspension 1, into heat energy. Thickness of the viscous-elastic layer 61 is 50 μm. The viscous-elastic layer 61 is made from, for example, acrylic resin. The restraint layer 62 is formed on the viscous elastic layer 61. The restraint layer 62 restrains extension of the viscous-elastic layer 61, which is vibrated, so as to restrict transmitting the vibration to the head slider 3. The restraint layer 62 is made from resin, e.g., polyamide, or a metal, e.g., stainless steel.

An opening 63 is formed in a part of the anti-vibration member 6, which covers the spring section 5. The opening 63 is a through-hole passing the viscous-elastic layer 61 and the restraint layer 61. A size of the opening 63, in the longitudinal direction of the head suspension 1, is 20–40 μm; a size of the opening 63, in the transverse direction of the head suspension 1, is 80–100 μm; area of the opening 63 is 0.0016–0.004 mm². By forming the opening 63, the spring section 5 is not excessively covered with the anti-vibration member 6, so that the change of the elastic pressure of the head suspension 1, which is caused by covering the spring section 5 with the anti-vibration member 6, can be restricted, In the head suspension 1, on which the anti-vibration member 6 is adhered, shown in FIG. 5, the elastic pressure is 0.5 gf. If the anti-vibration member 6 has no opening 63, the elastic pressure is changed 5–10%.

Figure 7A:
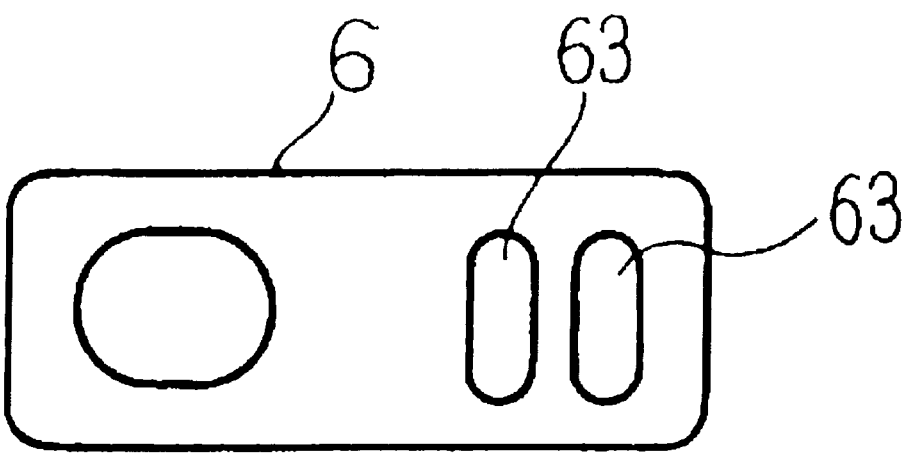
FIG. 7A is a plan view of another example of the anti-vibration member.
Figure 7B:
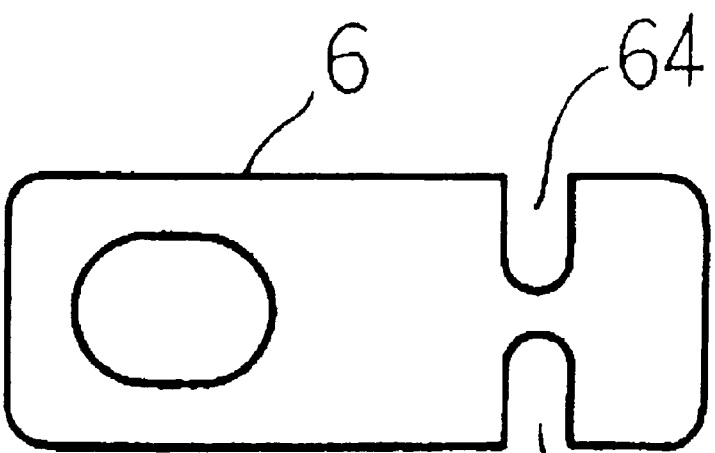
FIG. 7B is a plan view of another example of the anti-vibration member.
Figure 7C:
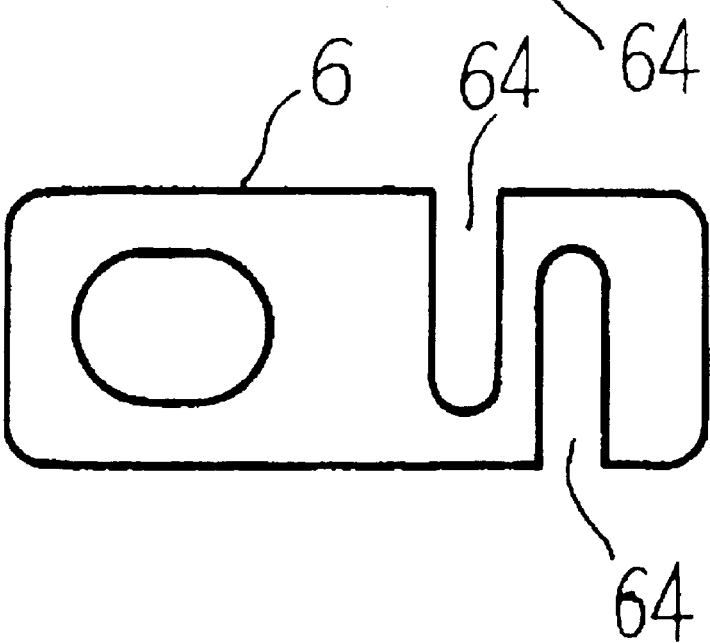
FIG. 7C is a plan view of another example of the anti-vibration member.

In the anti-vibration member 6, the elliptical opening 63 is formed, but the shape of the opening 63 is not limited. Area of the anti-vibration member 6 may be reduced by not only the opening 63 but also other means. Other planar shapes of the anti-vibration member 6 are shown in FIGS. 7A–7C. In FIG. 7A, a plurality of openings 63 are formed in the part covering the spring section 5. In FIG. 7B, slits 64 are respectively formed on longitudinal edges of the anti-vibration member 6. The slits 64 are symmetrically formed with respect to a center line of the anti-vibration member 6. Note that, a plurality of the slits 64 may be formed on one edge and one slit 64 may be formed on the other edge. In FIG. 7C, the slits 64 are formed, on the longitudinal edges, in a zigzag form.

If the area of the anti-vibration member 6 covering the spring section 5 is made broader, a shockproof property can be improved, but the elastic pressure of the head suspension 1 is changed and the floating level of the head slider 3 is badly influenced. By forming the opening 63 on the slits 64 in the anti-vibration member 6, the area of the anti-vibration member 6 covering the spring section 5 is made small, so that the change of the elastic pressure of the head suspension 1 can be restricted. With this structure, the shockproof property can be improved, the elastic pressure of the head suspension 1 can be properly maintained, and the head slider 3 can be stably floated above the hard disk.

Figure 8:
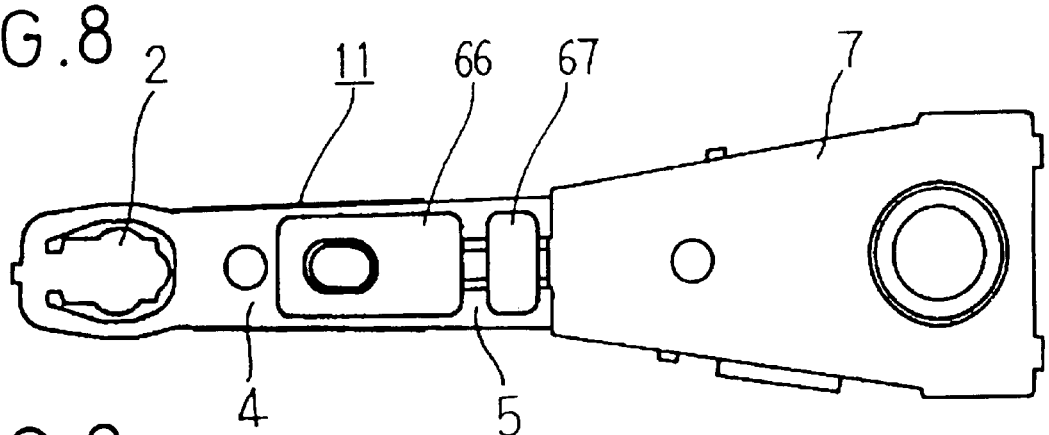
FIG. 8 is a plan view of the head suspension of a second embodiment.

A second embodiment of the head suspension 11 of the present invention is shown in FIG. 8. FIG. 8 is a plan view of a surface of the head suspension 11, which does not face the hard disk 21. The structure of the head suspension 11 is equal to that of the head suspension 1 of the first embodiment except the anti-vibration member 6.

In the first embodiment, the anti-vibration member 6 covers the rigid section 4 and the spring section 5. In the present embodiment, the anti-vibration member is divided into two members: a first anti-vibration member 66, which covers the rigid section 4; and a second anti-vibration member 67, which covers the spring section 5. The first and second anti-vibration members 66 and 67 are formed into rectangles, and their outer edge corners are rounded. Width, thickness, materials, and a layer structure of the first and second anti-vibration members 66 and 67 are equal to those of the anti-vibration member 6 of the first embodiment. But, sizes of the anti-vibration members 66 and 67, in the longitudinal direction of the head suspension 11, are different from that of the first embodiment. The length of the first anti-vibration member 66 is 3.5 mm; the length of the second anti-vibration member 67 is 0.4 mm.

In the second embodiment, the anti-vibration member is divided into two members 66 and 67. Therefore, area of the second anti-vibration member 67, which covers the spring section 5, can be smaller, so that the change of the elastic pressure of the head suspension 11 can be restricted. With this structure, the shockproof property can be improved, the elastic pressure of the head suspension 11 can be properly maintained, and the head slider 3 can be stably floated above the hard disk.

Figure 9:
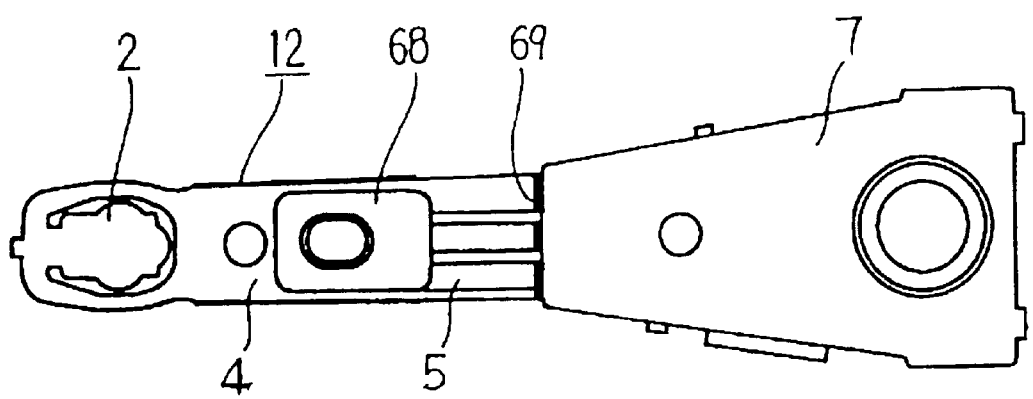
FIG. 9 is a plan view of the head suspension of a third embodiment.

A third embodiment of the head suspension 12 of the present invention is shown in FIG. 9. FIG. 9 is a plan view of a surface of the head suspension 12, which does not face the hard disk 21. The structure of the head suspension 12 is equal to that of the head suspension of the first and second embodiments except the anti-vibration member 6.

In the first and second embodiments, the anti-vibration members, which covers the rigid section 4 and the spring section 5, have the two-layered structure. In the third embodiment the two-layered anti-vibration member 6 is provided to cover the rigid section 4. A viscous-elastic resin section 69 is formed at a border between the spacer 7 and the spring section 5. The anti-vibration member 6 of the rigid section 4 is formed into a rectangle and its outer edge corners are rounded. Length of the anti-vibration member 6 is 3.0–3.5 mm, and thickness, width, a layer structure and material are equal to those of the anti-vibration member 6 of the first embodiment. On the other hand, the viscous-elastic resin section 69, which is provided on the spring section 5, is made from, for example, acrylic resin.

In the third embodiment, no anti-vibration member, which includes a restraint member and a viscous-elastic member, is provided in the spring section 5. But, the spacer 7 acts as the restraint member. Namely, the viscous-elastic resin section 69 absorbs the vibration, and the spacer 7 restricts extension and contraction of the viscous-elastic resin section 69, so that transmitting vibration to the head slider 3 can be restricted. No restraint member is provided to the spring section 5, so the toughness of the spring section 5 is not made too great and the head slider 3 can be stably floated above the hard disk.

Figure 1B:
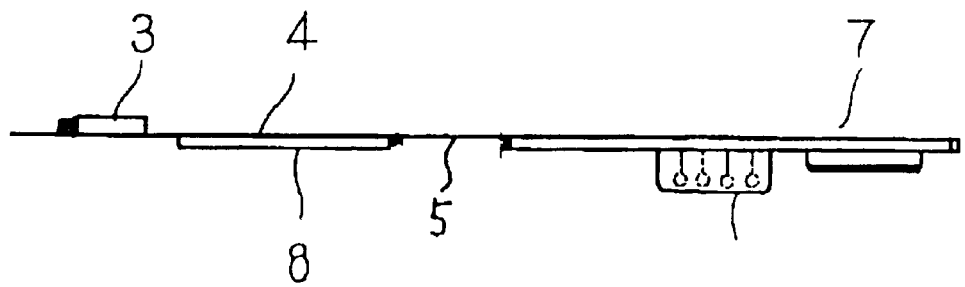
FIG. 1B is a side view of the conventional head suspension.
Figure 2:
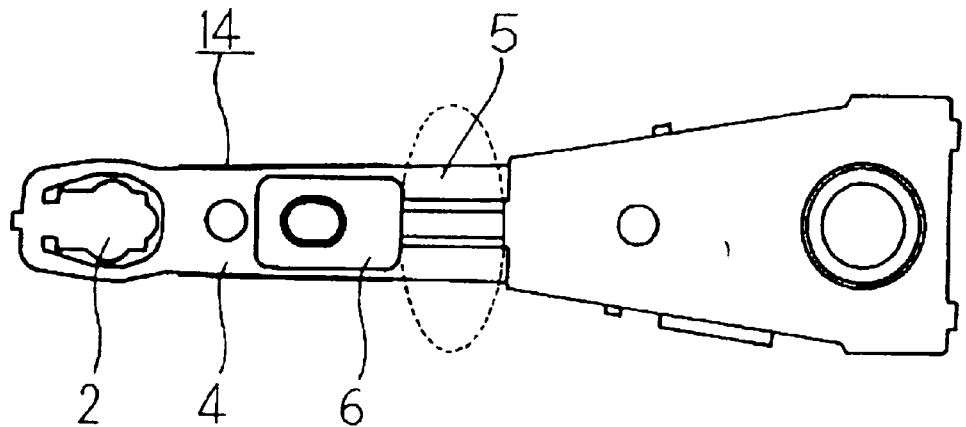
FIG. 2 is a plan view of the conventional head suspension having the anti-vibration member.

The head suspension of the present invention will now be compared with the conventional head suspension shown in FIGS. 1A, 1B and 2. They will be compared as to characteristics of vibration and damping effect.

Figure 10:
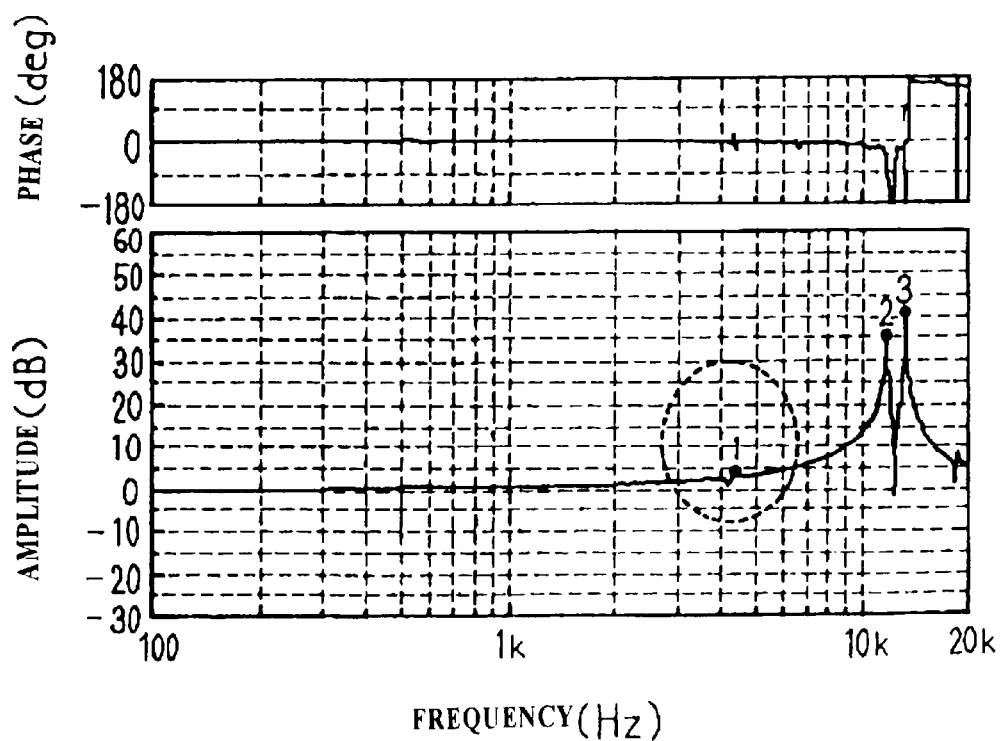
FIG. 10 is a graph showing anti-vibration characteristics of the head suspension.

To observe the characteristics of vibration, the head suspensions were assembled in the hard disk drive units, the spacers 7 of the head suspensions were vibrated, and the amplitude of the vibration of the head sliders 3 was observed. The result of the conventional head suspension is shown in FIG. 10. In FIG. 10, the horizontal axis indicates frequency (Hz); the vertical axis indicates the amplitude (dB). According to FIG. 10, in the conventional head suspension, vibration occurred, and great peaks were observed in an area in which the head slider 3 was mounted. The peak 2 shown in FIG. 10 stands for the peak value of the head suspension 14 shown in FIG. 2; the peak 3 shown in FIG. 10 stands for the peak value of the head suspension 13 shown in FIGS. 1A and 1B. On the other hand, in the head suspension 1 of the present invention, the vibration was not amplified. The transmission of the vibration to the head slider was restricted (see the peak 1 in FIG. 10).

Figure 11A:
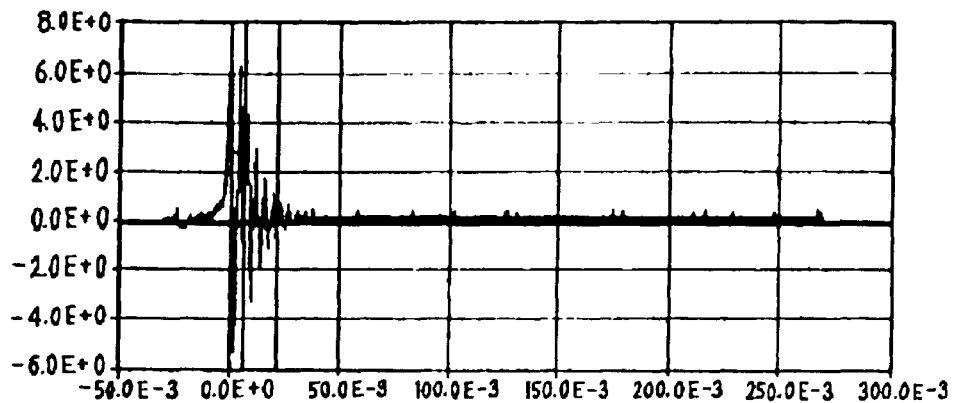
FIGS. 11A–11C are graphs showing vibration-damping characteristics of the head suspension.
Figure 11B:
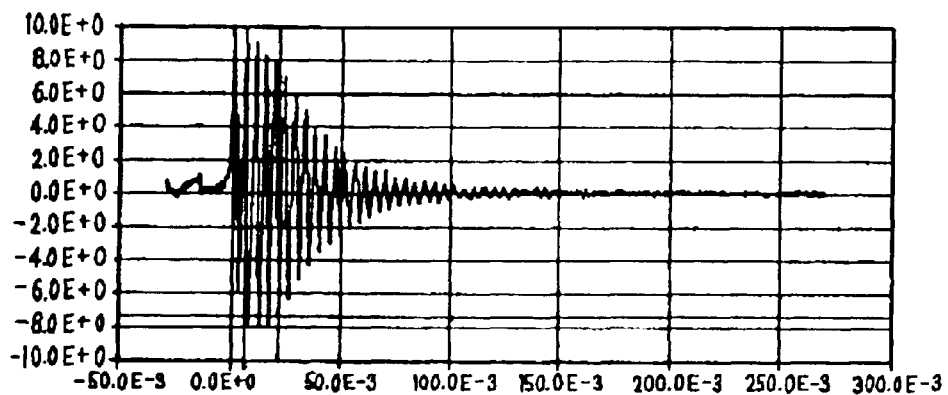
Figure 11C:
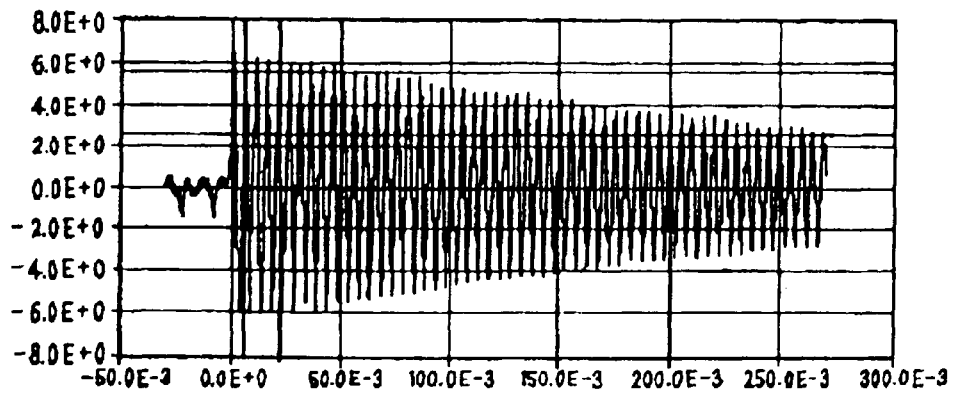

Next, to observe the damping effect of the head suspensions, the head suspensions were vibrated, and damping time of the vibration of the head suspensions was observed. In FIGS. 11A–C, the horizontal axes indicate time; the vertical axes indicate amplitude. FIG. 11A shows the result of the head suspension 1 of the present invention; FIGS. 11B and 11C respectively show the results of the conventional head suspensions 14 and 13.

According to FIGS. 11A–11C, in the case of the head suspension 13 shown in FIGS. 1A and 1B, which has no anti-vibration member, it took a very long time to converge the vibration. In the case of the head suspension 14 shown in FIG. 2, which has no anti-vibration member, the vibration was not effectively restricted. On the other hand, in the case of the head suspension 1 of the present invention, the spring section 5 was partially covered with the anti-vibration member 6, so that the damping time of the vibration was made shorter. In comparison with the conventional head suspension 14 shown in FIG. 2, the vibration of the head suspension 1 could be converged in half the time.

In the present invention, the anti-vibration member covers the spring section of the head suspension, so that the vibration of the head slider can be effectively restricted.

By partially covering the spring section with the anti-vibration member, the change of the elastic pressure of the head suspension can be properly restricted, and the head slider can be stably floated above the hard disk. And, by employing the head suspension in the disk drive unit, the reliability of the disk drive unit can be highly improved.

In each of the above described embodiments, the anti-vibration member 6, which includes the viscous-elastic layer 61 and the restraint layer 62, is adhered on the base member of the head suspension. The anti-vibration members 6, which take effective measures to the static electricity, are shown in FIGS. 12A–14B.

Figure 12A:
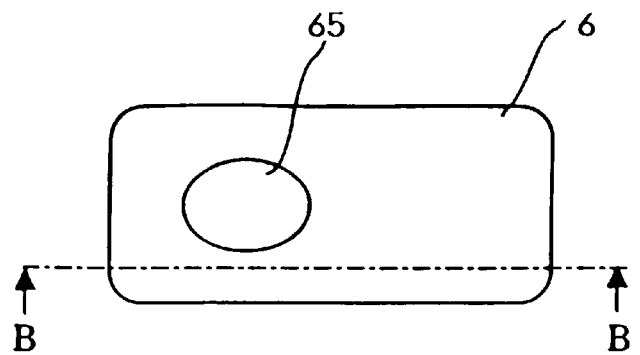
FIG. 12A is a plan view of another anti-vibration member.
Figure 12B:
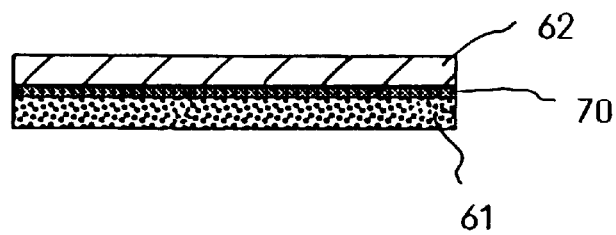
FIG. 12B is a side view of the anti-vibration shown in FIG. 12A.

The anti-vibration member 6 shown in FIGS. 12A and 12B has an electric conductive layer 70 between the viscous-elastic layer 61 and the restraint layer 62 as an intermediate layer. The electric conductive layer 70 is the characteristic point. The viscous-elastic layer 61 is an adhesive resin layer having thickness of 50 μm; the restraint layer 62 is a polyamide layer having thickness of 50 μm; the electric conductive layer 70 is an aluminum layer, which is formed by evaporation, having thickness of about 600 angstrom. The electric conductive layer 70 can be made of not only aluminum but also other metals. The electric conductive layer 70 can be formed by not only evaporation but also sputtering, printing with carbon ink, etc.. The thickness of the electric conductive layer 70 may be optionally designed. Preferable surface resistance of the electric conductive layer 70 is $10_{-6}$ [Ω] or less. By sandwiching the electric conductive layer 70 between the viscous-elastic layer 61 and the restraint layer 61, the electric conductive layer 70 is never peeled off from the anti-vibration member.

Figure 13A:
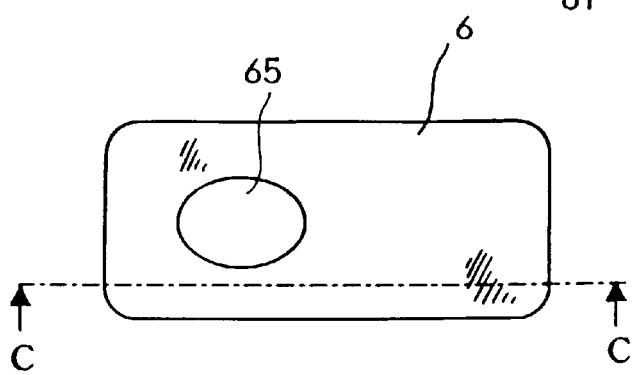
FIG. 13A is a plan view of another anti-vibration member.
Figure 13B:
FIG. 13B is a side view of the anti-vibration shown in FIG. 13A.

The anti-vibration member 6 shown in FIGS. 13A and 13B has an electric conductive layer 71, which is formed on an outer side of the restraint layer 62. The electric conductive layer 71 is the characteristic point. The electric conductive layer 71 is also formed, on an outer face of the restraint layer 62, by evaporation, spattering, etc. as well. The thickness of the viscous-elastic layer 61 and the restraint layer 62 are equal to those of the example shown in FIGS. 12A and 12B. By forming the electric conductive layer on an outer face of the anti-vibration member 6, charging of static electricity can be effectively prevented. Further, if the anti-vibration member 6 has the electric conductive layer 70, which is sandwiched between the viscous-elastic layer 61 and the restraint layer 62, and the electric conductive layer 71, which is formed on the outer face of the restraint layer 62, charging of static electricity can be further effectively prevented. Note that the restraint layer 62 may be made of a metal as described above.

Figure 14A:
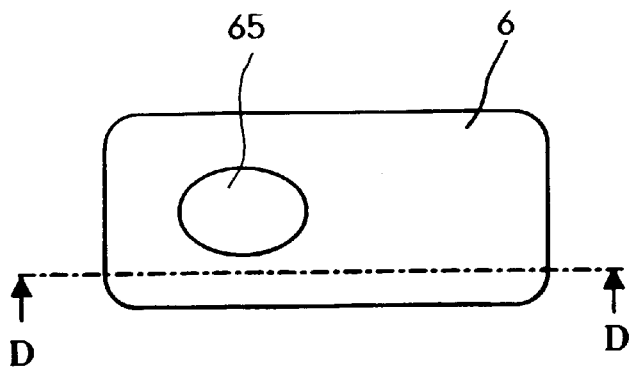
FIG. 14A is a plan view of another anti-vibration member.
Figure 14B:
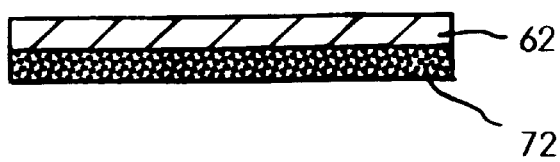
FIG. 14B is a side view of the anti-vibration shown in FIG. 14A.

The anti-vibration member 6 shown in FIGS. 14A and 14B has two layers; a viscous-elastic layer 72, which is an electric conductive layer; and the restraint layer 62. Conventionally, the viscous-elastic layer is made of an insulating material; the viscous-elastic layer 72 is made of an electric conductive material, which is, for example, a resin including an electric conductive material, e.g., carbon. The anti-vibration member 6 has the conductive viscous-elastic layer 72, so that charging of static electricity can be effectively prevented. In this example, the conductive viscous-elastic layer 72 acts as the conductive layer.

As described above, in the step of adhering the anti-vibration member 6 onto the base member of the head suspension, the static electricity is apt to charge when the anti-vibration member 6 is peeled off from a release paper. In the conventional anti-vibration member, both of the viscous-elastic layer and the restraint layer are made of electrically insulating materials, so it is difficult for electric charges to move and static electricity is apt to accumulate. And, the head element on the head slider is apt to be damaged by the charged static electricity. On the other hand, in the anti-vibration members having the electric conductive layers, the electric charges can easily move through the electric conductive layers. Namely, the static electricity can be grounded, so that damaging the head element can be effectively prevented. By forming the electric conductive layer or layers in the anti-vibration member, the head suspension can be assembled without neutralizing the static electricity by a neutralizing device, e.g., an ionizer, and the head suspension can be assembled efficiently. The function of grounding the static electricity has an effect on the static electricity, which is generated when the anti-vibration member is peeled off from the release paper, the head suspension is assembled and conveyed, and the disk drive unit is driven. Namely, the head element, which is highly made very precise and is apt to be damaged by the static electricity, can be effectively protected from the static electricity. Further, the reliability of the disk drive unit having the head suspension of the present invention can be highly improved.

The invention may be embodied in other specific forms and without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A head suspension, comprising:

a rigid section for holding a head slider which writes data on and reads data from a disk, said rigid section being capable of bearing an external force whose direction is perpendicular to a recording face of the disk;

a spring section having elasticity in the direction perpendicular to the recording face of the disk; and a single anti-vibration member at least partially covering said rigid section and at least partially covering said spring section, said anti-vibration member having at least one vacant space, the at least one vacant space being located over said spring section.

2. A disk drive unit, comprising:

a disk on which data are recorded;

a spindle motor for rotating said disk;

a head for writing data on and reading data from said disk; and a head suspension including:

a rigid section for holding said head, said rigid section being capable of bearing an external force whose direction is perpendicular to a recording face of said disk;

a spring section having elasticity in the direction perpendicular to the recording face of said disk; and a single anti-vibration member covering both at least a portion of said rigid section and at least a portion of said spring section, said anti-vibration member having at least one vacant space, at least one vacant space being located over said spring section.

3. The head suspension according to claim 1 wherein said anti-vibration member further includes a second vacant space positioned over said spring section.

4. The head suspension according to claim 1 wherein said vacant space has an area of between about 0.0016 mm$^2$ and about 0.004 mm$^2$.

5. The head suspension according to claim 1 wherein said vacant space comprises a hole having a longitudinal dimension of about 20–40 micron, and a transverse dimension of about 80–100 nm.

6. The head suspension according to claim 1 wherein said vacant space comprises a plurality of slits.

7. The head suspension according to claim 6 wherein said anti-vibration member includes a pair of longitudinal edges, and wherein at least one of said plurality of slits is on each of said longitudinal edges.

8. The head suspension according to claim 6 wherein said plurality of slits are arranger in a zigzag form.

* * * * *

UNITED STATES PATENT AND TRADEMARK OFFICE
CERTIFICATE OF CORRECTION

PATENT NO. : 6,704,164 B1
DATED : March 9, 2004
INVENTOR(S) : Shinji Hiraoka

It is certified that error appears in the above-identified patent and that said Letters Patent is hereby corrected as shown below:

<u>Column 10,</u>
Line 29, insert -- the -- before "at".
Line 48, delete "arranger" and insert -- arranged --.

Signed and Sealed this

Thirty-first Day of August, 2004

JON W. DUDAS
*Director of the United States Patent and Trademark Office*